(12) United States Patent
Wieting et al.

(10) Patent No.: US 8,151,978 B2
(45) Date of Patent: Apr. 10, 2012

(54) LOW BACKLINE PRESSURE MODULAR CONVEYING ASSEMBLY

(75) Inventors: Dean A. Wieting, Milwaukee, WI (US); Kevin S. Hansen, Grafton, WI (US); James C. Stebnicki, Glendale, WI (US)

(73) Assignee: Rexnord Industries, LLC, Milwaukee, WI (US)

( * ) Notice: Subject to any disclaimer, the term of this patent is extended or adjusted under 35 U.S.C. 154(b) by 1073 days.

(21) Appl. No.: 11/201,052

(22) Filed: Aug. 10, 2005

(65) Prior Publication Data

US 2006/0096841 A1   May 11, 2006

Related U.S. Application Data

(60) Provisional application No. 60/625,295, filed on Nov. 5, 2004.

(51) Int. Cl.
*B65G 17/24* (2006.01)
(52) U.S. Cl. .......................................... 198/853; 198/779
(58) Field of Classification Search .................. 198/853, 198/778
See application file for complete search history.

(56) References Cited

U.S. PATENT DOCUMENTS

| | | | |
|---|---|---|---|
| 4,231,469 A | 11/1980 | Arscott | |
| 4,729,469 A * | 3/1988 | Lapeyre et al. | 198/834 |
| 4,821,869 A | 4/1989 | Hodlewsky | |
| 4,880,107 A * | 11/1989 | Deal | 198/779 |
| 4,909,380 A | 3/1990 | Hodlewsky | |
| 5,096,050 A | 3/1992 | Hodlewsky | |
| 5,330,045 A | 7/1994 | Hodlewsky | |
| 6,148,990 A | 11/2000 | Lapeyre et al. | |
| 6,209,714 B1 | 4/2001 | Lapeyre et al. | |
| 6,367,616 B1 | 4/2002 | Lapeyre et al. | |
| 6,398,015 B1 * | 6/2002 | Sedlacek et al. | 198/779 |
| 6,932,211 B2 | 8/2005 | Wieting et al. | |

FOREIGN PATENT DOCUMENTS

NL   1 010 530 C2   5/2000

OTHER PUBLICATIONS

European Search Report dated Jan. 24, 2006.

* cited by examiner

*Primary Examiner* — Kavel Singh
(74) *Attorney, Agent, or Firm* — Quarles & Brady LLP

(57) ABSTRACT

A modular conveying assembly for reducing backline pressure when accumulating products includes a first roller belt module having a top surface and at least one first roller axle support extending above the top surface. The first axle support includes an opening. A second roller belt module adjacent to the first roller belt module has a top surface and at least one second roller axle support extending above the top surface. The second axle support includes an opening coaxial with the opening formed in the first roller axle support. A roller axle extends through the openings of the first and second axle supports. At least one roller is rotatably supported by the roller axle to reduce friction between the roller belt modules and an object carried along the conveyer belt assembly.

19 Claims, 1 Drawing Sheet

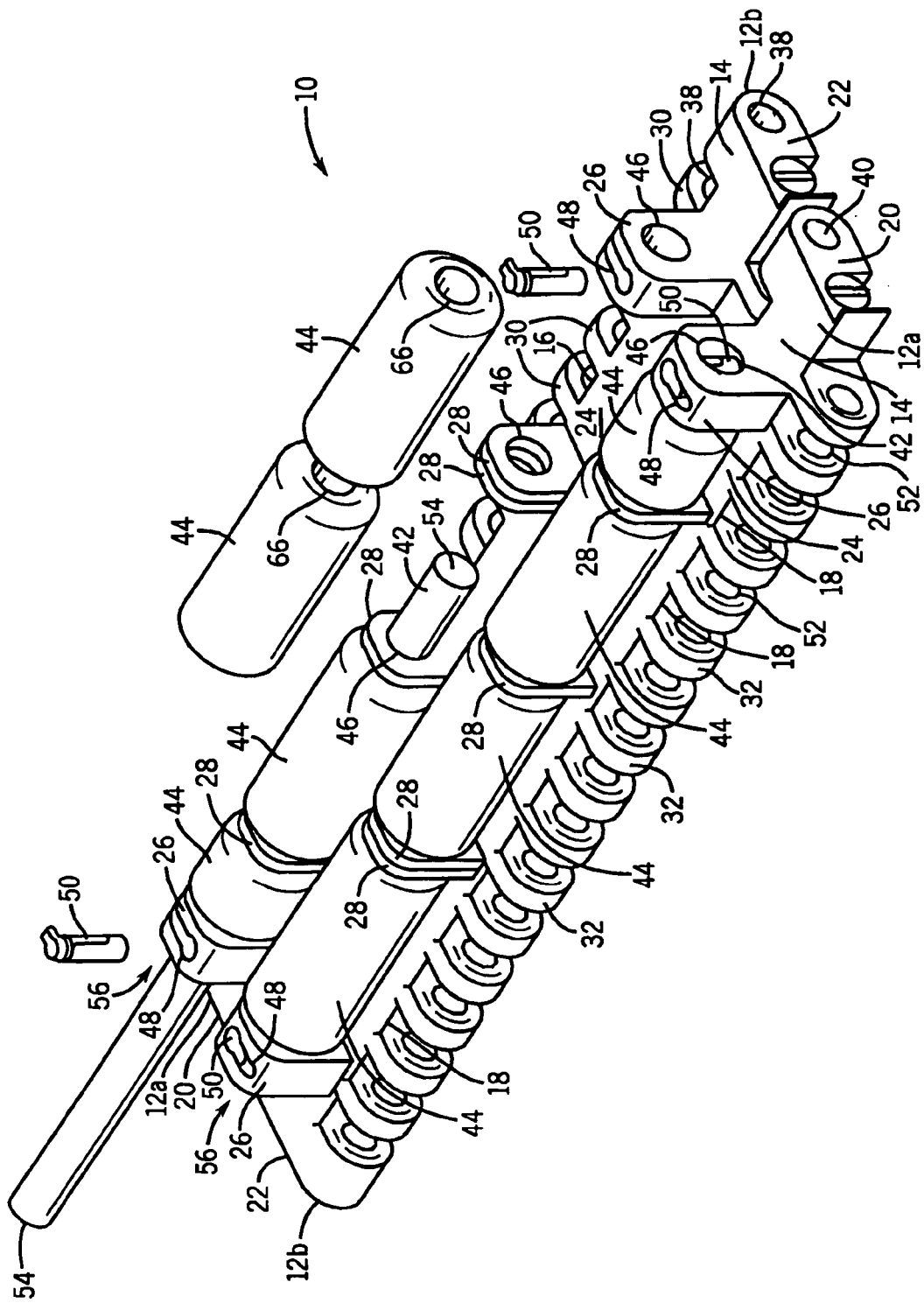

LOW BACKLINE PRESSURE MODULAR CONVEYING ASSEMBLY

CROSS REFERENCES TO RELATED APPLICATIONS

This application claims the priority benefit of U.S. provisional Patent Application No. 60/625,295 filed on Nov. 5, 2004.

STATEMENT REGARDING FEDERALLY SPONSORED RESEARCH

Not Applicable.

BACKGROUND OF THE INVENTION

The present invention relates to modular conveyor belts and chains, and more particularly to a low backline pressure conveyor module and a modular conveying assembly including at least one of the conveyor modules.

Modular belting and chains are formed from interconnected modules that are supported by a frame and driven to transport a product. Each module has a support surface which supports the product as the belting or chain is being driven along the frame. Adjacent modules are connected to each other by hinge pins inserted through hinge members extending from adjacent modules in the direction of the belt travel.

Modular belts can transport products in the direction of conveyor travel, but have difficulty accumulating a product to reduce backline pressure. In addition, high friction products can easily damage the belt if the product is accumulated. One known solution to this problem is to rotatably mount rollers directly on the hinge pin connecting modules together, such that the hinge pin supports the rollers between hinge members. The roller rotates about an axis of rotation that is substantially coaxial with the hinge pin axis. Because it is necessary to have a portion of the roller extend above the module to engage the object being conveyed to reduce backline pressure, the required roller diameter is determined by the hinge pin location and the height of the module. Unfortunately, this often results in requiring a large diameter roller that extends both above and below the module when that configuration is not always desired. Moreover, supporting the roller on the pin alone can result in undesirable pin wear.

Another known solution for reducing backline pressure is disclosed in U.S. Pat. No. 4,231,469 issued to Arscott. In Arscott rollers are supported by roller cradles between modules. The rollers extend above the cradle for rolling contact with an object being conveyed independent of the location of the hinge pins. The rollers reduce friction between the belt and the object. Unfortunately, assembling the roller in the cradle is difficult, requiring insertion of the roller into the cradle, and then slipping an axle or two stub axles through holes formed through the cradle walls and into the roller. The axle must then be secured to prevent it from slipping out of one of the holes formed in the cradle wall.

SUMMARY OF THE INVENTION

The present invention provides a modular conveying assembly for reducing backline pressure when accumulating products. The conveying assembly includes a first roller belt module having a top surface and at least one first roller axle support extending above the top surface. The first axle support includes an opening. A second roller belt module adjacent to the first roller belt module has a top surface and at least one second roller axle support extending above the top surface. The second axle support includes an opening coaxial with the opening formed in the first roller axle support. A roller axle extends through the openings of the first and second axle supports. At least one roller is rotatably supported by the roller axle to reduce friction between the roller belt modules and an object carried along the conveyer belt assembly.

A general objective of the present invention is to provide a belt module and a modular conveying assembly formed therefrom that can accumulate objects without severely damaging the objects or the assembly. This objective is accomplished by providing a conveyor belt module having a roller rotatably supported above the conveyor module body top surface.

Another objective of the present invention to provide a conveying assembly having rollers supported by the top surface of at least some of the modules, wherein the rollers are easily replaced. This objective is accomplished by providing a roller axle that extends across the modules to allow removal of the axle without disassembling modules from the assembly.

This and still other objectives and advantages of the present invention will be apparent from the description which follows. In the detailed description below, preferred embodiments of the invention will be described in reference to the accompanying drawing. These embodiments do not represent the full scope of the invention. Rather the invention may be employed in other embodiments. Reference should therefore be made to the claims herein for interpreting the breadth of the invention.

BRIEF DESCRIPTION OF THE DRAWINGS

FIG. 1 is a perspective view of a modular conveyor belt incorporating the present invention.

DETAILED DESCRIPTION OF PREFERRED EMBODIMENTS

A modular conveying assembly, or belt 10, shown in FIG. 1, includes a plurality of belt modules 12a, 12b assembled in an edge to edge relation to form the continuous belt 10. Hinge pins 40 join adjacent modules 12a, 12b, and pivotally connect the adjacent modules 12a, 12b in the direction of belt travel. Roller axle supports 26, 28 extending upwardly from each belt module 12a, 12b support a roller axle 42 that rotatably supports a plurality of rollers 44. The rollers 44 rotatably engage an object being conveyed by the belt 10 to reduce friction between the belt 10 and the object. Advantageously, if the module 12a, 12b, or roller 44, is damaged, only the damaged component need be replaced. Although, the terms "leading" and "trailing" are used to identify features of the module 12a, 12b, the module 12a, 12b described herein can be used in any direction, or orientation without departing from the scope of the invention.

The modules 12a, 12b are preferably formed using methods known in the art, such as injection molding, from materials known in the art, such as acetal, polyethylene, polypropylene, nylon, and the like. Each module 12a, 12b includes a body 14 having a top surface 24 surrounded by a leading edge 16 and trailing edge 18 joined by a first side edge 20 and a second side edge 22. Advantageously, the top surface 24 can prevent products from falling through the belt 10. Of course, the top surface 24 can also have perforations to allow air or fluid flow for cooling, drafting, and/or draining. The module body 14 has a width which is defined by the distance between the side edges 20, 22, and a length which is defined by the distance between the leading and trailing edges 16, 18.

Each leading edge hinge member 30 extends forwardly from the leading edge 16 of the module body 14, and includes a coaxial opening 38 for receiving the hinge pin 40. Each leading edge hinge member opening 38 receives the hinge pin 40 pivotally connecting the leading edge hinge members 30 of one module 12a, 12b to trailing edge hinge members 32 of an upstream module 12a, 12b. The leading edge hinge members 30 intermesh with trailing edge hinge members 32 extending rearwardly from the trailing edge 18 also include coaxial openings 52. The trailing edge hinge members 32 include coaxial openings 52 that receive the hinge pin 40 to pivotally connect the trailing edge hinge members 32 of the module 12a, 12b to leading edge hinge members 30 of a downstream module 12a, 12b.

The roller axle supports 26, 28 are spaced across the module top surface 24 in rows 56 transverse to the direction of conveyor travel. An end axle support 26 proximal one side edge 20, 22 of each module 12a, 12b and intermediate axle supports 28 spaced between the end axle support 26 and the other side edge 20, 22 of the module 12a, 12b defines a row of axle supports 26, 28 having an end axle support 26 at each end of each row 56. Each axle support 26, 28 includes a coaxial opening 46 for receiving the roller axle 42. Advantageously, the axle supports 26, 28 do not allow the roller axle 42 to pop upwardly away from the modules 12a, 12b if the roller 44 or roller axle 42 catches an object.

When the modules 12a, 12b are configured in a belt arrangement, i.e. two or more modules 12a, 12b define the belt width and are arranged in a side edge to side edge and leading edge to trailing edge configuration, such as shown in FIG. 1 or a bricklaying configuration, the modules 12a, 12b defining the belt width edges have the end axle supports 26 proximal the belt width edges. For example, in the embodiment disclosed in FIG. 1, module 12a has a first module width that is different than module 12b having a second module width to form a belt 10 having a desired width equal to the sum of the first and second module widths. When more than two modules 12a, 12b are used to define the belt width, modules interposed between the modules 12a, 12b defining the belt width edges can be provided without end axle supports 26. Of course, if the modules are arranged in a chain arrangement, i.e. each individual module defines the width of the chain and the modules are arranged in a leading edge to trailing edge configuration only, each module will include an end axle support 26 proximal each side edge and the intermediate axle supports 28 are spaced across the top surface between the end axle supports of the individual module.

Each end axle support 26 includes a top aperture 48 intersecting the opening 46 formed in the end axle support 26. The top aperture 48 receives a plug 50 that engages an end 54 of the roller axle 42 to retain the roller axle 42 in the axle support coaxial openings 46 of a row 56. Of course, other means for retaining the roller axle 42 in the coaxial openings 46, such as methods well known in the art for retaining a hinge pin in hinge member openings can be used without departing from the scope of the invention.

The roller axle 42 is supported by axle supports 26, 28 extending from at least two of the belt modules 12a, 12b and extends across both modules 12a. 12b, and is received in the coaxial openings 46 of a row 56 of the axle supports 26, 28 defining the coaxial openings 46 between the top apertures 48 of the end axle supports 26 in the row 56. Preferably, the roller axle 42 extends across the entire width of the belt across both belt modules 12a, 12b and is supported by axle supports extending from each belt module crossed. However, the roller axle 42 can have a length shorter than the width of the belt or extend unsupported across a belt module between belt modules having axle supports without departing from the scope of the invention. The roller axle 42 can be formed from any material, such as a polymeric material, metal, and the like. Polymeric roller axles 42 are preferred because they are lighter and produce less noise. Each roller axle 42 supports a plurality of the rollers 44. Preferably, a single roller 44 is disposed between a pair of axle supports 26, 28, however, a plurality of rollers 44 can be provided between a pair of axle supports 26, 28 without departing from the scope of the invention.

The rollers 44 support an object being conveyed by the belt 10, and allows movement of the object in the direction of conveyor travel to reduce backline pressure. At least a portion of the roller 44 extends above the roller axle supports 26, 28 to engage the object being conveyed by the belt 10. Preferably, the roller 44 is molded from a plastic, and includes a throughhole 66 formed therethrough for receiving the roller axle. Advantageously, the roller 44 rotates around the roller axle to minimize friction between the belt 10 and object being conveyed and reduce the backline pressure of objects accumulating on the belt 10. Although a plastic roller is disclosed, the roller can be formed from any material, such as elastomers, metals, and the like, suitable for the particular application without departing from the scope of the invention.

The belt 10 is assembled by intermeshing the trailing edge hinge members 32 of one of the modules 12a, 12b with the leading edge hinge members 30 of the adjacent module 12, such that the trailing hinge member openings 52 of the one module 12a, 12b are aligned with and the leading edge hinge member openings 38 of the other module 12. A hinge pin 40 is then slipped through the aligned hinge member openings 38, 52 to pivotally link the adjacent modules 12a, 12b together.

The rollers 44 are then placed between the row 56 of axle supports 26, 28 of the adjacent modules 12a, 12b defining the belt width, and the roller axle 42 is slipped through the axle support openings and the roller throughhole 66 to rotatably support the rollers 44 above the module top surfaces 24. The plugs 50 are then pressed into the top apertures 48 of the end axle supports 26 to retain the roller axle 42 in the coaxial openings 46. Preferably, the belt modules 12a, 12b are arranged in rows, such that the rollers 44 are staggered across the belt width to avoid gaps between rollers that extend the length of the belt.

While there has been shown and described what are at present considered the preferred embodiments of the invention, it will be obvious to those skilled in the art that various changes and modifications can be made therein without departing from the scope of the invention defined by the appended claims.

We claim:

1. A modular conveying assembly comprising:

a first belt module including a body having a top surface, a first hinge member extending forwardly from the body in a direction of conveyor travel and including a first opening for receiving a first hinge pin, a second hinge member extending from the body in a direction opposite to the first hinge member and including a second opening for receiving a second hinge pin, and a roller axle support extending in an upward direction from the top surface, said roller axle support including an opening;

a second belt module including a body having a top surface, a first hinge member extending forwardly from the body in a direction of conveyor travel and including a first opening for receiving the first hinge pin, a second hinge member extending from the body in a direction opposite to the first hinge member and including a second opening for receiving the second hinge pin, and a roller axle support extending in an upward direction from the top surface, said axle roller support including an opening coaxial with said opening in said roller axle support extending from the top surface of said first belt module;
a roller axle extending between said first and second belt module and through said opening in at least one of the roller axle supports of each of said first and second modules; and
a roller rotatably supported by said roller axle.

2. The modular conveying assembly of claim 1, in which at least one of said modules includes a leading edge and a trailing edge and wherein the first hinge member extends from the leading edge and the second hinge member extends from the trailing edge.

3. The modular conveying assembly of claim 2, wherein the leading edge and the trailing edge are joined by a first side edge and a second side edge, and wherein said roller axle support extending from said top surface of said at least one of said modules is an end axle support proximal one of said first side edge and said second side edge.

4. The modular conveying assembly of claim 3, in which said end axle support includes an aperture intersecting said opening formed in said end axle support, and a plug removeably disposed within the aperture restricts the roller axle from being slideably removed from the opening in said end axle support.

5. The modular conveying assembly of claim 1 wherein the first hinge member of the first roller belt module is configured to engage a second hinge member of another roller belt module to form a portion of the modular conveying assembly.

6. The modular conveying assembly of claim 1 wherein the roller is formed of at least one of an elastomer and a metal and the roller axle is formed of at least one of a polymeric material and a metal.

7. The modular conveying assembly of claim 1 wherein the roller is configured to translate an object thereacross with reduced backline pressure.

8. The modular conveying assembly of claim 1, in which a side edge of said first belt module is adjacent to a side edge of said second belt module.

9. The modular conveying assembly of claim 1, in which said roller includes a throughhole, and said roller axle extends through said throughhole to rotatably support the roller.

10. The modular conveying assembly of claim 1 wherein the first roller belt module has a different width than said second roller belt module.

11. A modular conveying assembly comprising:
a first roller belt module, said first roller belt module having a top surface and at least one first roller axle support extending above said top surface and including an opening;
a second roller belt module adjacent to said first roller module, said second roller belt module having a top surface and at least one second roller axle support extending above said top surface and including an opening coaxial with said opening formed in said first roller axle support;
a roller axle extending between said first and second belt modules and through said openings of said at least one first axle support and said at least one second axle support; and
at least one roller rotatably supported by said roller axle to reduce friction between the roller belt modules and an object carried along the modular conveying assembly.

12. The modular conveying assembly of claim 11 wherein each coaxial opening extends transverse to a direction of conveyer belt assembly travel.

13. The modular conveying assembly of claim 11 wherein the first roller belt module has a different width than said second roller belt module.

14. The modular conveying assembly of claim 11, in which said roller axle support of said first roller belt module is an end axle support proximal a side edge of said first roller belt module.

15. The modular conveying assembly of claim 14, in which said end axle support includes an aperture intersecting said opening formed in said end axle, and a plug removable disposed within the aperture restricts the roller axle from being slideably removed from the opening in said end axle support.

16. The modular conveying assembly of claim 11, in which said first roller belt module includes a first hinge member extending forwardly from the top surface in a direction of conveyor travel and including a first opening for receiving a first hinge pin, and a second hinge member extending from the top surface in a direction opposite to the first hinge member and including a second opening for receiving a second hinge pin.

17. The modular conveying assembly of claim 11, in which a side edge of said first belt module is adjacent to a side edge of said second belt module.

18. The modular conveying assembly of claim 11, in which said roller includes a throughhole, and said roller axle extends through said throughhole to rotatably support the roller.

19. A modular conveying assembly comprising:
a first roller belt module, said first roller belt module having a top surface and a first roller axle support extending above said top surface and including a first opening;
a second roller belt module adjacent to said first roller module, said second roller belt module having a top surface and a second roller axle support extending above said top surface and including a second opening;
a roller axle extending between said first and second belt modules and through said first and second openings of said first and second axle supports; and
at least one roller rotatably supported by said roller axle to reduce friction between the roller belt modules and an object carried along the modular conveying assembly.

* * * * *